United States Patent [19]
McConnell et al.

[11] Patent Number: 5,464,183
[45] Date of Patent: Nov. 7, 1995

[54] STROLLER ACCESSORY BAR AND DRINK HOLDER

[75] Inventors: Thomas E. McConnell, Santa Ynez; Peter C. Arnold, Santa Maria, both of Calif.

[73] Assignee: Prince Lionhears, Inc., Santa Maria, Calif.

[21] Appl. No.: 75,689

[22] Filed: Jun. 10, 1993

Related U.S. Application Data

[63] Continuation-in-part of Ser. No. 274, Oct. 9, 1992.
[51] Int. Cl.⁶ .................................................. A47K 1/08
[52] U.S. Cl. ................................. 248/311.2; 248/215
[58] Field of Search ........................ 248/311.2, 309.1, 248/314, 214, 215, 227; 224/42.39

[56] References Cited

U.S. PATENT DOCUMENTS

| | | | |
|---|---|---|---|
| 232,461 | 9/1880 | Coolbaugh | 248/311.2 X |
| 2,316,389 | 4/1943 | Atkinson | 248/311.2 X |
| 3,113,677 | 12/1963 | Johnson | 248/214 X |
| 3,184,201 | 5/1965 | Smith | 248/311.2 |
| 4,131,259 | 12/1978 | Franks | 248/311.2 |
| 4,856,744 | 8/1989 | Frankel | 248/215 |
| 4,971,279 | 11/1990 | George | 248/214 |
| 5,014,948 | 5/1991 | Asaro | 248/215 |
| 5,014,956 | 5/1991 | Kayali | 248/311.2 |
| 5,020,755 | 6/1991 | Frankel | 248/215 |
| 5,054,732 | 10/1991 | Sukup | 248/309.1 |
| 5,106,046 | 4/1992 | Rowles et al. | 248/311.2 |
| 5,143,335 | 9/1992 | Frankel | 248/215 |
| 5,190,257 | 3/1993 | Gradei et al. | |
| 5,238,211 | 8/1993 | Borovski | 248/311.2 |

*Primary Examiner*—Ramon O. Ramierz
*Attorney, Agent, or Firm*—Stetina Brunda & Buyan

[57] ABSTRACT

An accessory has an elongate support member which is adjustable in length to accommodate attachment to various items such as strollers, wheelchairs, walkers, and the like, and has attachment means for removably attaching the support member thereto. At least one hook for carrying items such as a handbag, shopping bags, a diaper bag, etc., is formed upon the support member. A drink holder formed upon the support member adjusts in size to accommodate various sizes of drinks. The drink holder is pivotally mounted such that the drink remains upright regardless of the angular orientation of the support member. A drink holder used independently of the accessory is also disclosed.

43 Claims, 6 Drawing Sheets

STROLLER ACCESSORY BAR AND DRINK HOLDER

RELATED APPLICATIONS

The subject patent application is a continuation-in-part of co-pending U.S. design patent application Ser. No. 29/000,274, filed on Oct. 9, 1992.

FIELD OF THE INVENTION

The present invention relates generally to baby strollers and relates more particularly to an accessory for holding items such as a purse, shopping bags, a diaper bag, etc. and also to a drink holder for holding a drink in an upright and convenient position such that it is readily accessible to the user. The accessory may be used on strollers, wheelchairs, walkers, and the like. The drink holder may be used on strollers, wheelchairs, walkers, bicycles, grocery carts, lawnmowers, shower bars, lawn chairs, airport carts, hospital beds, exercise bikes, changing tables, golf carts, and the like.

BACKGROUND OF THE INVENTION

Baby carriages or strollers for transporting infants and toddlers are well known. Such strollers are commonly used to transport infants during outings, when shopping, or when running errands. They provide a generally convenient means for carrying the child, as well as the various child care items typically required on such trips.

It is generally necessary to carry a variety of child care items on such excursions. For example, it is usually necessary to bring extra diapers, baby wipes, bottles and/or baby food, etc. Additionally, particularly when shopping, it is often necessary to carry one or more shopping bags, generally containing purchases made while shopping.

It is also common to carry a drink on such outings. Such drinks are typically contained within a disposable paper or plastic cup, a bottle, or a can, although various other types of containers are likewise suitable and commonplace. As used herein, the term drink is meant to comprise all such containers.

Although strollers often have built-in racks or compartments to facilitate carrying various items, i.e., child care items, shopping bags, etc., such is not always the case. Indeed, even in those instances where such racks or compartments are provided, they are often inadequate for carrying the desired quantity of such items. Furthermore, access to such items is often inconvenient in that it is typically necessary to bend over and unlatch the lids of such containers in order to insert or remove items therein.

Furthermore, large, odd size, or bulky items typically cannot be carried within such built-in racks or compartments. Thus, such items must be carried by hand. Carrying such items by hand is both inconvenient and potentially hazardous. Carrying such items by hand is inconvenient since it limits the user's ability to use their hands for other tasks, i.e. inspecting goods to be purchased. Carrying such goods by hand is also tiresome.

Carrying such goods by hand is potentially hazardous since it limits the use of the user's hands, thereby preventing quick action in case of emergencies. It also limits the user's ability to control the stroller. Furthermore, such items may be dropped and thus may potentially cause tripping accidents.

Additionally, the need to continuously hold a drink in one's hand while pushing a stroller presents similar such problems. Holding such a drink is both inconvenient and potentially hazardous for the above mentioned reasons.

One example of a device which facilitates the carrying of items upon a stroller, including drinks, is disclosed in U.S. Pat. No. 4,856,744, issued on Aug. 15, 1989 to Frankel, and entitled HANDLE SUPPORT ASSEMBLY. Another such device is disclosed in U.S. Pat. No. 5,020,755, issued on Jun. 4, 1991, and in U.S. Pat. No. 5,143,335, issued on Sep. 1, 1992, both patents also issued to Frankel and entitled HANDLE SUPPORT ASSEMBLY.

All three of the Frankel patents disclose a support assembly for utilization with generally horizontal handles, bars, shafts, and the like, for securement of articles thereto. The support assembly includes both a unit which is integrally formed with a handle and a discrete assembly for attachment to handles. The assembly is preferably of integrally molded plastic that comprises at least first and second hook portions adapted for supporting articles such as packages, clothing, and purses from strollers, carts, and the like. The assembly may also include a receptacle region adapted for the retention of a canned drink, baby bottle, loose articles, or the like.

Thus, although such strollers have proven generally suitable for their intended purposes, they possess inherent deficiencies which detract from their overall effectiveness in the marketplace. As such, it is desirable to provide a stroller accessory which facilitates the carrying of child care items, shopping bags, etc., as well as a drink, such that the user need neither attempt to stow such items upon the stroller itself or carry such items by hand.

SUMMARY OF THE INVENTION

The present invention specifically addresses and alleviates the above mentioned deficiencies associated with the prior art. More particularly, the present invention comprises an accessory for strollers, wheelchairs, walkers, and the like having an elongate support member which is adjustable in length to accommodate various stroller sizes, etc., and which has attachment means for removably attaching the support member to the stroller or other item. At least one hook for carrying items such as a handbag, shopping bags, a diaper bag, etc. is formed upon the support member. A drink holder formed upon the support member adjusts in size to accommodate various sizes of drinks. The drink holder is pivotally mounted such that the drink remains upright regardless of the angular orientation of the support member.

Alternative embodiments of the stroller accessory are disclosed wherein the elongate support member accommodates collapsible or folding strollers. In one alternative embodiment, the elongate support member folds along with the stroller into a V-configuration. In another alternative embodiment, the elongate support member is repositioned prior to folding of the stroller. A sliding sleeve may optionally be utilized to cover a pivot formed in the middle of the elongate support member to prevent inadvertent folding thereof.

The means for attaching the support member to the stroller or like item comprise resilient cushions formed upon either end of the support member and straps attached to the support member such that a portion of a handle of the stroller is capturable by each strap such that the captured portion of the stroller handle abuts a cushion.

The means for attaching the support member to the stroller may optionally comprise a semicircular snap member configured to partially encircle and capture generally vertical members of the stroller. Hook and loop fastening straps may optionally be utilized along with the semicircular snap attachments.

The drink holder may be used on strollers, wheelchairs, walkers, bicycles, grocery carts, lawnmowers, shower bars, lawn chairs, airport carts, hospital beds, exercise bikes, changing tables, walkers, golf carts, and the like. Thus, the stroller accessory bar and drink holder of the present invention may be adapted to attach to a wide variety of different items so as to be utilized therewith. Thus, although use of the present invention is described and illustrated herein as being used on strollers, such use is by way of illustration only and not by way of limitation. Those skilled in the art will recognize that the stroller accessory and the drink holder are suitable for use in a wide variety of different applications.

The drink holder comprises an annular support member and a plurality of fingers extending downwardly from the annular support member. The fingers are configured to grip a drink disposed therebetween and are biased inwardly and movable outwardly such that various sizes of drinks are accommodated thereby. The fingers preferably bend inwardly as they extend downwardly from the annular support member and preferably further comprise substantially horizontal support members configured such that the drink rests thereupon.

The drink holder preferably attached to the support member which, in turn, attaches to a stroller, wheelchair, walker, or the like. The drink holder may optionally be attached directly to a structural member of a stroller, wheelchair, bicycles, grocery cart, lawnmower, shower bar, lawn chair, airport cart, hospital bed, exercise bike, changing table, walker, golf cart, and the like. Thus, the drink holder need not be used with the accessory, but rather may be utilized independently thereof.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The stroller accessory of the present invention is illustrated in FIGS. 1 through 18 which depict four presently preferred embodiments of the invention. Referring now to FIGS. 1 through 5, the first embodiment of the present invention is generally comprised of an elongate bar or support member 12 having attachment means 14 formed upon both ends thereof to facilitate attachment of the support means 12 to a stroller 16.

A plurality of first 18 and second 20 hooks are formed upon the support member 12. The first hooks 18 are rigidly attached to the support member 12 and the second hooks 20 are slidably attached thereto such that they may be repositioned therealong as desired. The second hooks 20 preferably comprise first 20a and second 20b hook members to enhance the utility thereof.

A drink holder 22 is formed upon the support member 12 such that a drink, i.e. a beverage can, cup, glass, bottle, or other container, may be held thereby.

Figures 4, 5:
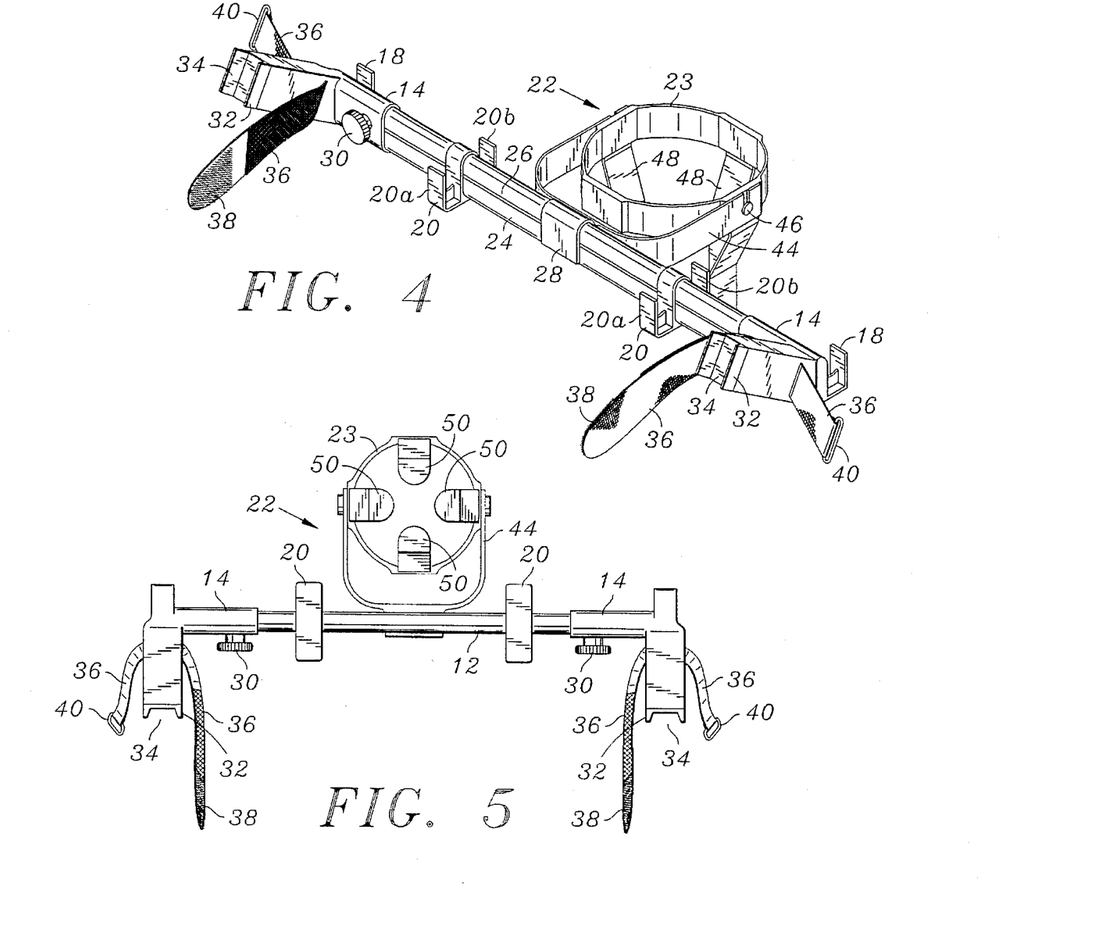
FIG. 4 is an enlarged perspective view showing the front of the stroller accessory of FIG. 1.
FIG. 5 is an enlarged bottom view of the stroller accessory of FIG. 1.
Figure 6:
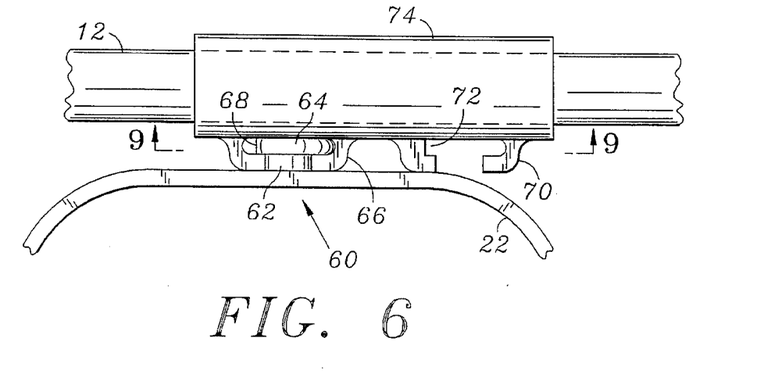
FIG. 6 is a sectional top view of a stroller accessory showing an alternative configuration of the drink holder having a drink holder pivot and drink holder pivot lock.
Figure 7:
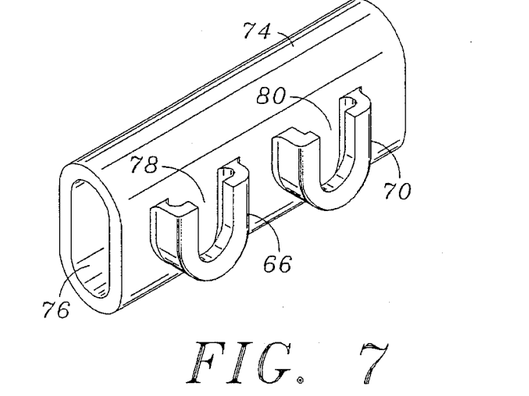
FIG. 7 is an enlarged perspective view of the drink holder pivot and drink holder pivot lock of FIG. 6.
Figure 8:
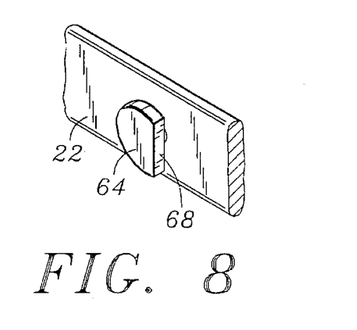
FIG. 8 is an enlarged perspective view of the pivot post formed upon the drink holder and which is receivable within the drink holder pivot and drink holder pivot lock of FIG. 7.
Figure 9:
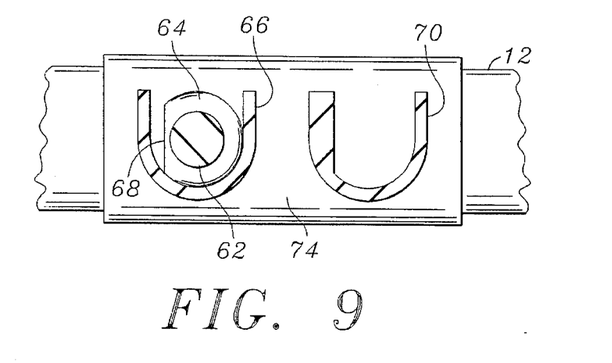
FIG. 9 is a cross-sectional view taken along lines 9 of FIG. 6.

The elongate support member preferably comprises a hollow track upon which the second hook 20 and the drink holder 22 are positionable as desired. The forward facing surface 24 of the support member 12 preferably comprises a channel 26 (as shown in FIG. 4) into which detent members (not shown) formed upon the second hooks 20 and the attachment means 28 of the drink holder 22 are received. By disposing the detents of the second hooks 20 and the drink holder 22 within the channel 26 of the support member 12, the positioning thereof upon the support member 12 is secured. The detent is particularly useful in attaching the attachment means 28 of the drink holder 22 to the support member 12 since the attachment means 28 is open on the bottom, i.e., substantially configured as an inverted U. Thus, the detent formed thereon prevents the attachment means 28 from inadvertently slipping up off of the support member 12.

The support member 12 is preferably comprised of extruded metal, i.e., steel or aluminum, such that adequate strength is provided thereby. Those skilled in the art will recognize that various other materials, i.e., plastic, wood, various other metals, etc. are likewise suitable. Also, various other configurations, i.e., solid, square, triangular, etc., are likewise suitable.

Each attachment means 14 functions as an end piece for the support member 12. Each attachment means 14 is adjustably attached to the support member 12 such that the overall length of the support member 12 may be varied by varying the relative position of each attachment member 14 thereto. Each attachment means 14 comprises a set screw (not shown) having a knob 30 formed thereupon for maintaining positioning of each attachment means 14 relative to the support member 12 as desired. The attachment means 14 threadably receives the set screw which then engages or abuts the support member 12, preferably within the channel formed therein.

Alternatively, the channel 26 may be formed to have a T cross-section such that an enlarged distal end, i.e., the head thereof, of the set screw is captured within the channel 26 and each attachment member 14 is secured in position by tightening the knob 30 such that the enlarged portion of the set screw captured within the channel 26 abuts a portion of the channel when the knob 30 is tightened, thereby clamping a portion of the support member 12 intermediate the enlarged portion of the set screw disposed within the channel 26 and the attachment member 14. Those skilled in the art will recognize that various other means for adjustably attaching the attachment means 14 to the support member 12 are likewise suitable.

Resilient cushions 32 having a groove 34 formed therein are formed upon the attachment means 14 such that the grooves 34 define contact surfaces for abutting the stroller handle 42.

A strap 36 having a hook and loop fastener portion 38 and a buckle member 40 extend from the attachment means 14 such that the stroller handle 42 can be captured by the straps 36 and caused to firmly abut the cushions 32.

Figures 1, 2:
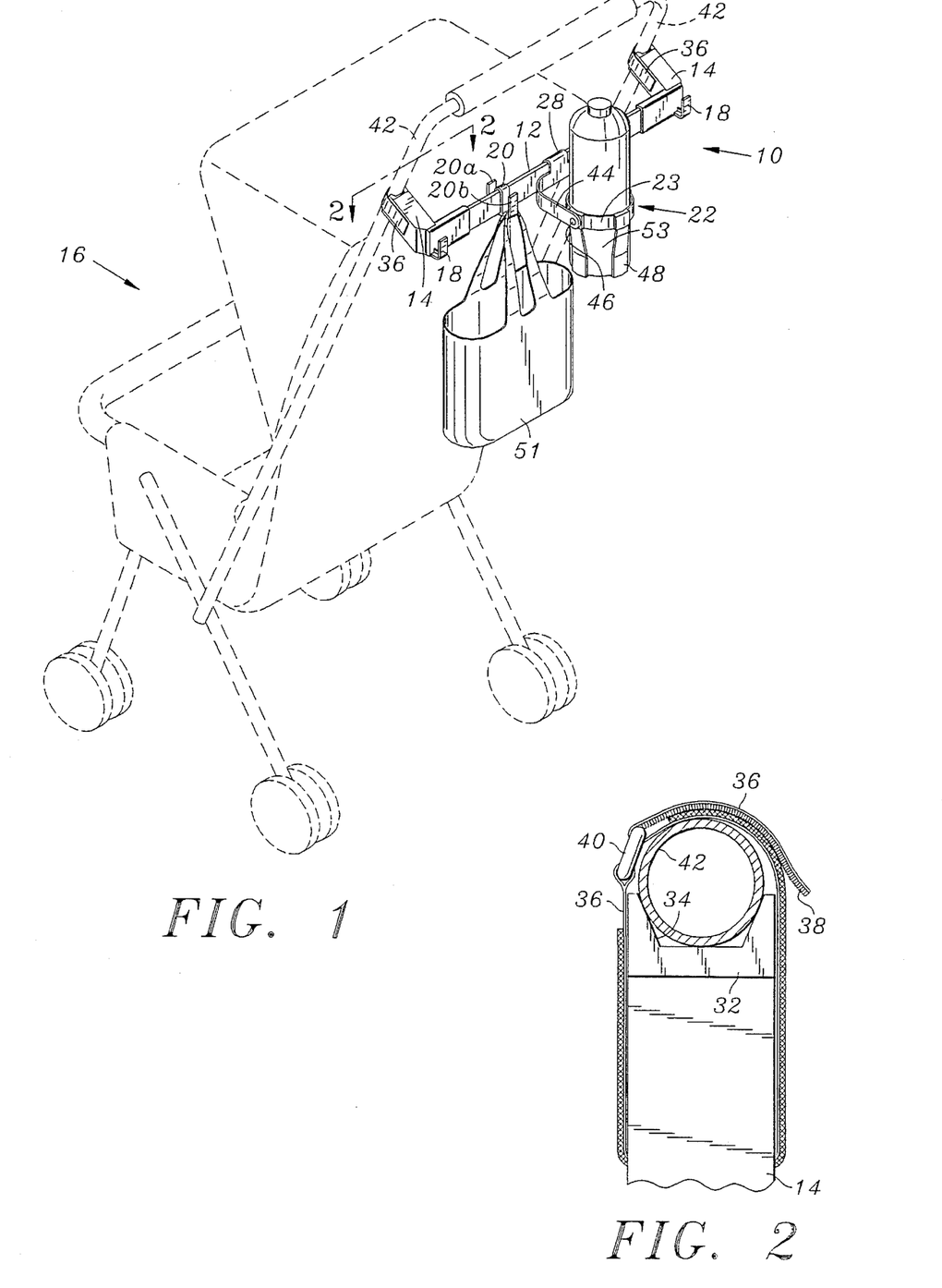
FIG. 1 is a perspective view of a first embodiment of the stroller accessory of the present invention, illustrating its attachment to a stroller.
FIG. 2 is an enlarged cross-sectional view taken along lines 2 of FIG. 1.
Figure 3:
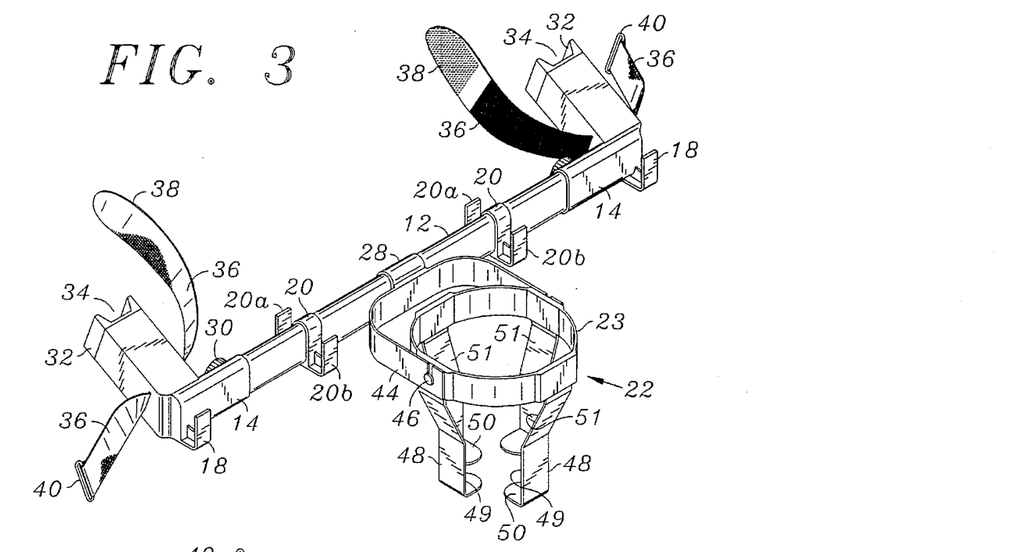
FIG. 3 is an enlarged perspective view showing the rear of the stroller accessory of FIG. 1.

With particular reference to FIGS. 1 and 2, the hook and loop fastener portion 38 of the strap 36 loops about and captures a portion of the stroller's handle 42 to securely attach the stroller accessory to the stroller 16. Thus, the stroller accessory 10 is easily installed by looping the hook and loop fastener portion 38 of the strap 36 through the buckle 40 thereof with the handle portion 42 of the stroller 16 captured between the strap 36 and the cushion 32.

Each end piece or attachment member 14 preferably has a first hook 18 formed thereon. The hooks 18 are preferably integrally formed with the end pieces 14, preferably via injection molding.

A plurality, preferably two, of second hooks 20 are slidably positionable along the support member 12. Each second hook 20 preferably comprises first 20a and second 20b hook members, each defining a separate hook, such that at least one item may be attached to each of the first 20a and second 20b hook members.

The drink holder 22 comprises an attachment member 28, a U-shaped support member 44 formed to the attachment member 28, an annular support 23 pivotally attached to the U-shaped support member 44 via pivots 46, and downwardly extending fingers 48 depending from the annular support 23. The support member 44 may optionally extend completely around the annular support member 23, thus providing protection thereto, so as to mitigate the likelihood of a spill occurring due to the annular support 23 being accidentally bumped.

Each downwardly extending finger 48 is biased inwardly and movable outwardly such that various sizes of drinks are accommodatable thereby. Each finger 48 is preferably bent inwardly as it extends downwardly from the annular support 23. Each finger 48 preferably comprises a substantially horizontal support member 50 configured such that the drink rests thereupon when the drink holder 22 is used. Each finger 48 also preferably comprises an upper portion 51 and a lower portion 49 formed at an angle thereto.

The attachment means 14, second hooks 20, and the drink holder 22 are preferably comprised of a durable plastic material, i.e., PVC, ABS, etc. However, those skilled in the art will recognize that a variety of other materials, i.e. metal, wood, etc. are likewise suitable.

Having thus described the structure of the first embodiment of the stroller accessory of the present invention, it may be beneficial to describe the operation thereof. The stroller accessory is utilized by first attaching it to a stroller. In order to attach the stroller accessory 10 of the present invention to the stroller 16, the length of the support member 12 is adjusted such that the positions of the cushions 32 formed upon the attachment members 14 correspond to the generally vertical portions of the handle 42 of the stroller 16. The length of the support member 12 is adjusted by moving one or both of the attachment members 14 relative thereto. Attachment member 14 is moved relative to the support member 12 by first loosening the knob 30 attached to the set screw (not shown) such that the attachment member 14 is free to slide upon or move relative to the support member 12. Sliding either attachment member 14 relative to the support member 12 varies the effective length of the support member 12 such that various distances between the substantially vertical support members of the stroller handle 42 may be accommodated thereby.

The hook and loop fastener straps 36 of each attachment member 14 are unbuckled and the cushions 32 thereof abutted to the handle 42 of the stroller 16 such that the handle 42 is received within the grooves 34 of the cushions 32. The straps 36 are then buckled by passing the hook and loop fastener portions 38 thereof through the buckles 40 and folding the hook and loop fastener portion over such that the hook and loop fasteners thereof engage.

The strap 36 is pulled sufficiently tight to cause the handle portion 42 of the stroller 16 to firmly abut and substantially deform the resilient cushion 32 of the attachment member 14. Thus, the attachment members 14 of the stroller accessory 10 of the present invention rigidly attach the stroller accessory 10 to the stroller 16 as illustrated in FIG. 1.

After attaching the stroller accessory 10 of the present invention to a stroller 16, the second hooks 20 and the drink holder 22 may be positioned as desired such that a handbag, shopping bag 51, diaper bag, etc. may be conveniently positioned upon the first hooks 18 or second hooks 20 and such that a drink 53 may be disposed within the drink holder 22. The positions of the second hooks 20 and/or the drink holder 22 may be varied at any time as desired.

The pivots 46 of the drink holder 22 allow the annular support 23 and the fingers 48 to pivot such that the drink 53 disposed therein remains level to accommodate various configuration, i.e. angles of inclination, of stroller handles 42. Additionally, the pivots 46 of the drink holder 22 allow a drink contained therein to remain substantially level as the stroller is tilted to accommodate curbs, stairs, etc.

Various sizes, i.e. diameters of drinks or beverage containers are easily accommodated by the drink holder 22. Smaller drinks generally rest upon the horizontal feet 50 of the fingers 48 and are maintained in position by the lower portions 49 of the fingers 48 which define a contact surface of reduced diameter. Larger drinks or containers may rest upon the horizontal feet 50, but are generally held in position by the upper portions 51 of the fingers 48 and/or the annular member 23 thereof. Thus, the drink holder 22 of the stroller accessory 10 of the present invention readily accommodates a wide range of drink or container sizes and configurations.

Referring now to FIGS. 6–9, the drink holder 22 may alternatively be attached either to the support member 12 or directly to the stroller or other item upon which is to be mounted via a second pivot 60 which comprises a pivot post 62 having a button-like head 64 formed thereupon and at least one U-shaped slot 66 into which the head 64 of the pivot post 62 is receivable.

Optionally, the head 64 of the pivot post 62 may comprise a flat portion 68 and one of the slots may comprise a locking slot 70 having a complimentary flat side 72 configured so as to prevent rotation of the head 64 of the pivot post 62 and consequently preventing rotation of the drink holder 22. Thus, the position of the drink holder and any drink contained therein may be locked, so as to prevent spilling, by inserting the head 64 of the pivot post 62 into the locking slot 70. Such would be advantageous in the event that any other carried items are likely to contact the drink holder 22 and cause it to overturn. For example, a large handbag or a full shopping bag disposed proximate the drink holder 22 might occasionally bump thereinto. By locking the drink holder 22 such that it does not rotate about the pivot post 62, the drink holder 22 is prevented from overturning due to impacts it receives from the handbag or shopping bag.

In this preferred embodiment of the present invention, a non-locking slot 66 and a locking slot 70 are formed in an adjacent, i.e. side-by-side, manner upon a sleeve 74 which is slidably disposed upon support member 12 such that the position of the drink holder 22 may be varied, as desired, along the length of the support bar 12. Thus, the sleeve 74 contains an elongate bore 76 formed therethrough and within which the support member 12 is disposed.

Both the non-locking slot 66 and the locking slot 70 are preferably formed to have openings 78 and 80, respectively, formed at the upper end thereof such that the head 64 of the pivot post 62 may be lifted out of and placed into the non-locking slot 66 and locking slot 70, as desired.

Figure 10:
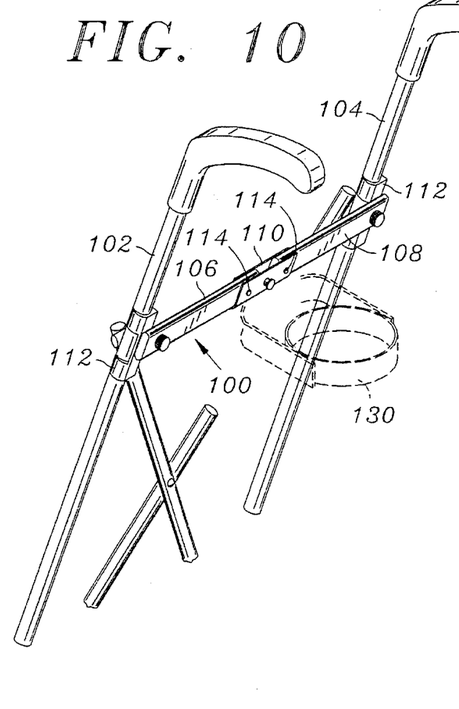
FIG. 10 is a perspective view of a folding stroller utilizing a second embodiment of the present invention having a folding support member and a pivoting drink holder according to the present invention and showing the stroller in the deployed configuration.
Figure 11:
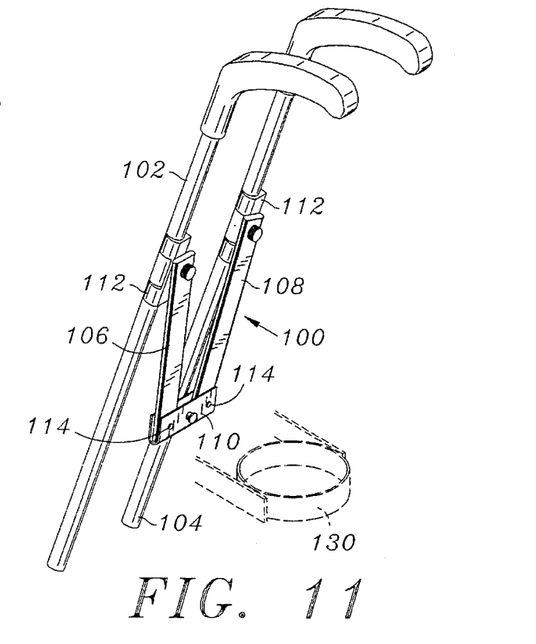
FIG. 11 is a perspective view of a folding stroller utilizing a folding support member and a pivoting drink holder according to the present invention and showing the stroller in the stowed configuration.
Figure 12:
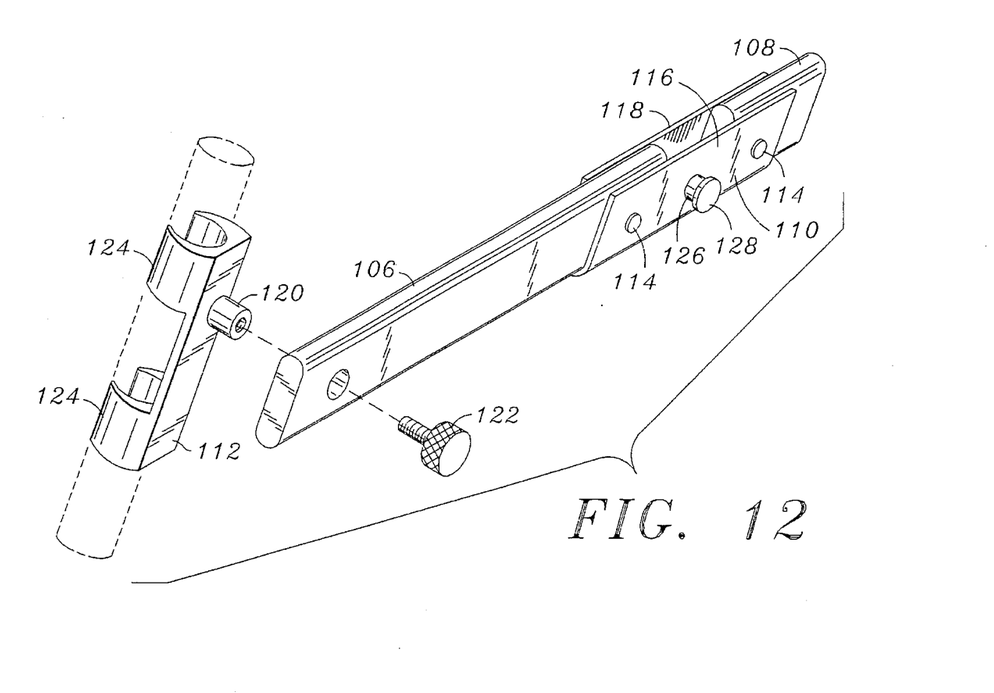
FIG. 12 is an enlarged perspective view of the support member and snap attachment of FIGS. 10 and 11.

Referring now to FIGS. 10–12, a second embodiment of the stroller accessory bar of the present invention has a two-part support member 100 which attaches to the first 102 and second 104 collapsible stroller vertical members and which buckles or folds to facilitate folding of the collapsible stroller. The support member 100 comprises first 106 and second 108 elongate members attached together via a double pivot bracket 110 and having snap attachments 112 formed at opposite ends thereof so as to facilitate attachment to the first 102 and second 104 vertical members of the stroller.

The double pivot flange 110 preferably comprises a generally U-shaped (in cross-section) member which receives the inboard ends of the first 106 and second 108 elongate members such that the first 106 and second 108 elongate members pivot about pivot pins 114 which pass through the first 116 and second 118 sides of the pivot bracket 110 as well as the inboard ends of the first 106 and second 108 elongate members.

The outboard ends of the first 106 and second 108 elongate members are pivotally attached to the snap attachments 112, preferably via apertures formed in the ends of the first 106 and second 108 elongate members which pivotally receive threaded bosses 120 formed on the snap attachments 112. Fasteners, preferably knurled screws 122, are threadably received within the bosses 120 to pivotally attach the first 106 and second 108 elongate members to the snap attachments 112.

Each snap attachment 112 comprises at least one, preferably two, pairs of snaps 124 wherein each pair of snaps comprises a generally semi-circular member configured to receive and snap over the first 102 and second 104 vertical members of the stroller so as to securely attach thereto. Those skilled in the art will recognize that various configurations of snap attachments are likewise suitable. A pivot post 126 having a head 128 formed thereupon pivotally receives a drink holder 130, preferably in the manner described above.

Figures 13, 14:
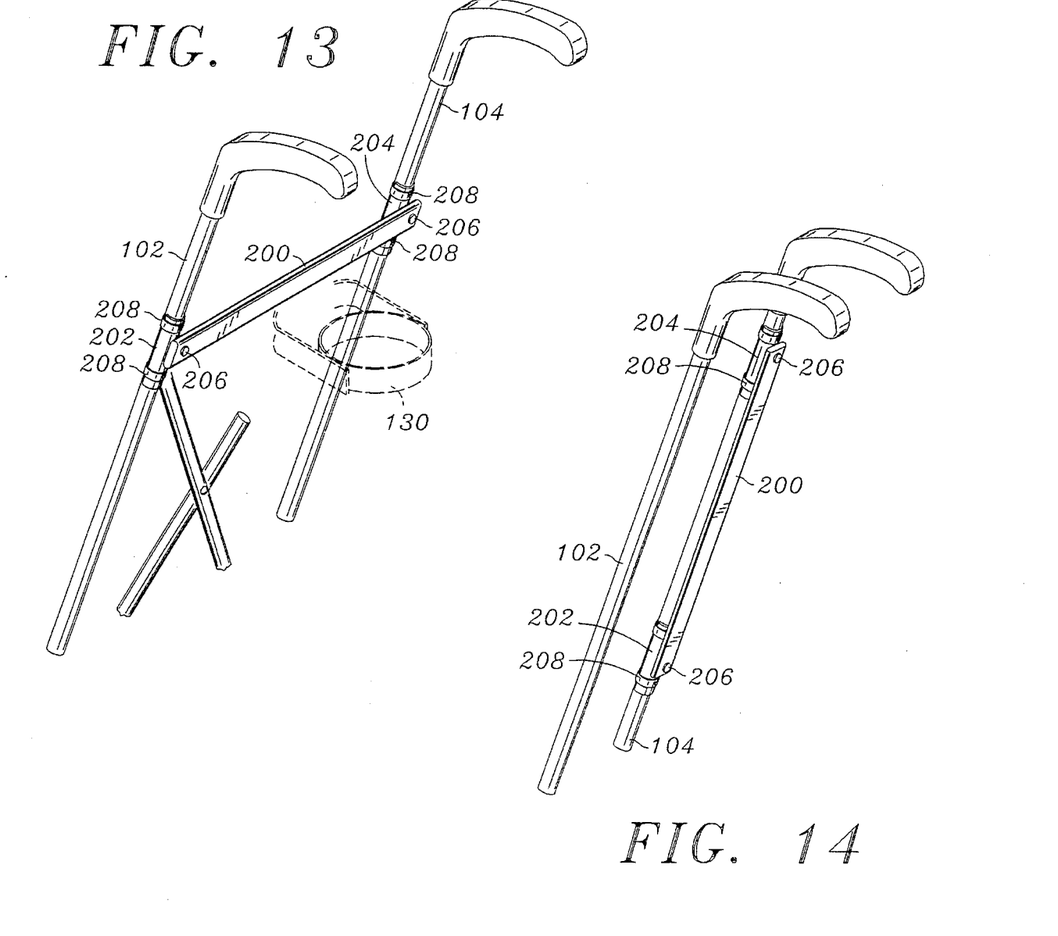
FIG. 13 is a third embodiment of the present invention having an alternative or rigid configuration of the support member suitable for use with folding strollers, showing the stroller in the deployed configuration.
FIG. 14 is a perspective view of the support member of FIG. 13 showing the stroller in the stowed configuration.
Figure 15:
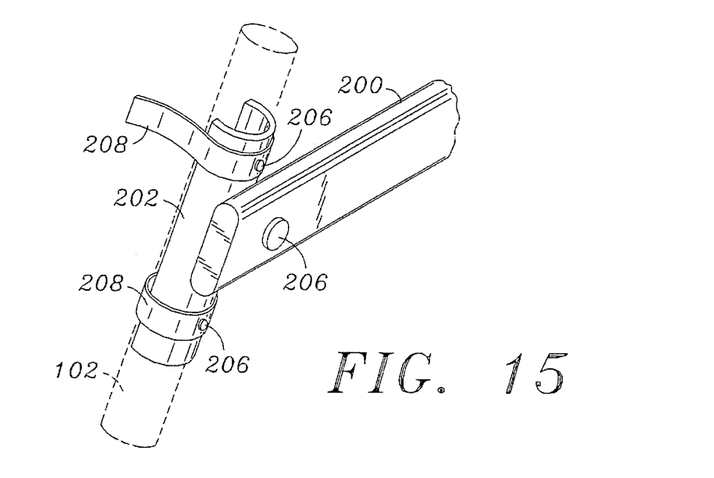
FIG. 15 is an enlarged perspective view of the hook and loop fastener/snap attachment of FIGS. 13 and 14.

Referring now to FIGS. 13–15, in a third embodiment of the stroller accessory bar and drink holder of the present invention, a single, rigid, elongate support member 200 interconnects the first 102 and second 104 generally vertical members of a stroller and supports a drink holder 130. The drink holder 130 preferably comprises an assembly such as that illustrated in FIGS. 3–5 or optionally one having a third pivot, such as that illustrated in FIGS. 6–9. Attachment to the elongate member 200 via a sliding sleeve such as that illustrated in FIGS. 6–9 facilitates both rigid and pivotal attachment of the drink holder 130 to the elongate member 200, as desired.

First 202 and second 204 hook and loop/snap attachments attach the elongate support member 200 to the first 102 and second 104 vertical support members of the stroller, respectively. The first 202 and second 204 hook and loop/snap attachments are connected to the elongate member 200 via pivot pins 206.

Each hook and loop/snap attachment 202 and 206 comprise generally U-shaped elongate members having at least one, preferably two, optional hook and loop straps attached thereto such that the U-shaped members may be snapped onto the vertical elongate members 102 and 104 of the stroller and the hook and loop straps 208 may then be wrapped around the first 102 and second 104 vertical members to further secure the elongate support member 200 thereto.

Folding of the stroller may be accomplished in one of three different ways. First, the stroller may be folded by merely loosening the hook and loop straps 208 on one, i.e. the first, hook and loop/snap attachment 202 so as to allow that hook and loop/snap attachment 202 to slide downwardly as the stroller is collapsed and the first 102 and second 104 elongate members are urged toward one another.

Thus, in the stowed configuration, the elongate member 200 is disposed generally vertically and still extends from the first 102 to the second 104 vertical member.

Alternatively, a second method for facilitating folding of the stroller may be utilized wherein one, i.e., the first, hook and loop/snap attachment 202 is removed from the first 102 vertical member and reattached to the second vertical member 104 prior to collapsing the stroller. Thus, when stowed, the elongate support member 200 extends vertically, parallel to the second vertical member 104.

Optionally, in a third method for facilitating folding of the stroller, an additional or second hook and loop/snap attachment (same as 202 of FIG. 14) is provided on the second vertical member 104 such that the first hook and loop/snap attachment 202 may be disconnected from the elongate support member 200, i.e. via removal of the pivot pin or fastener 206, and the elongate support member 200 swung downward to the position as illustrated in FIG. 14, prior to folding of the stroller.

Figure 16:
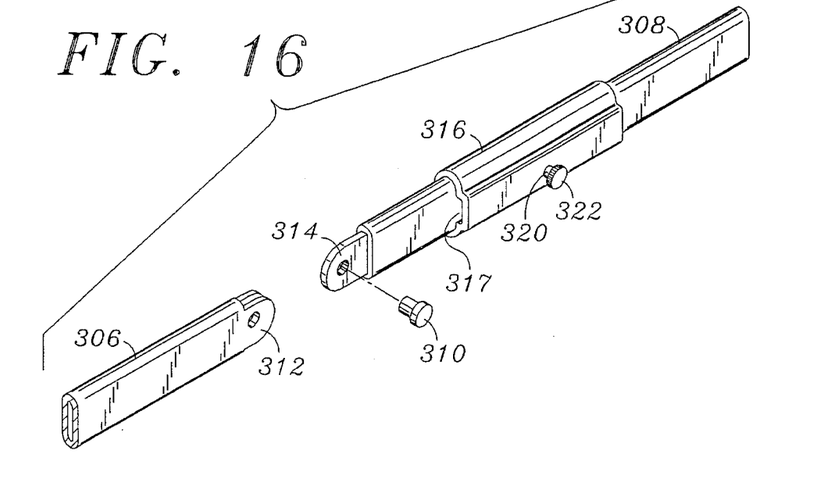
FIG. 16 is a perspective view of a fourth embodiment of the present invention having a foldable support member and a locking sleeve, showing the two support members thereof detached from one another and the locking pin removed therefrom.

Referring now to FIG. 16, an alternative configuration of the folding or two-part support member comprises first 306 and second 308 elongate members attachable together via optionally removable pivot pin 310 which is insertable through apertures 312 formed in the first 306 elongate member and an aperture 314 formed in the second elongate member 308. A sliding sleeve 316 is slidable over the optionally removable pivot pin 310 to prevent its accidental removal and to lock the first 306 and second 308 elongate members in their deployed or extended position.

The sliding sleeve 316 further comprises a pivot pin 320 having a head 322 formed thereon for receiving a drink holder, as discussed above.

Figure 17:
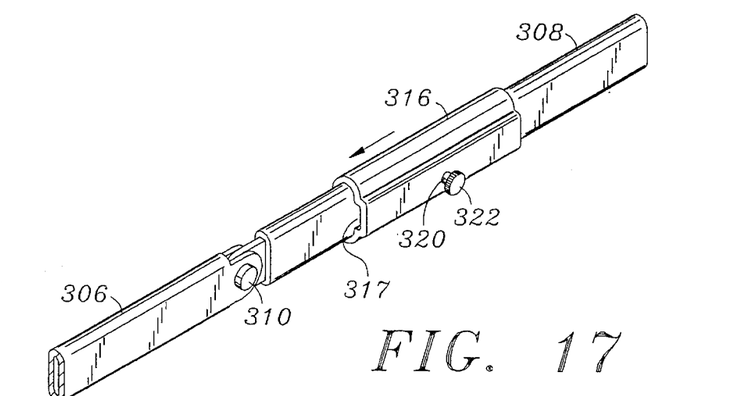
FIG. 17 is a perspective view of the support member of FIG. 16, showing the two elongate members thereof attached together, i.e. the locking pin inserted.
Figure 18:
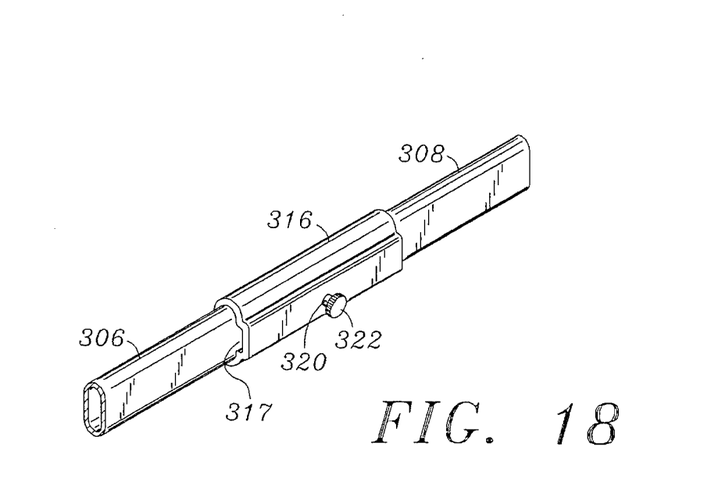
FIG. 18 is a perspective view of the support member of FIGS. 16 and 17, showing the locking sleeve disposed over the pivot thereof, thus locking the two elongate members in a deployed configuration.

Thus, the sliding sleeve 316 may be slid into position so as to cover the pivot pin 310, the head of the pivot pin 310 being received within the channel 317 formed within the sliding sleeve 316. In this position, the sliding sleeve 316 locks the first 306 and second 308 elongate members into their extended position.

To fold the stroller, the sliding sleeve 316 is slid away from the pivot pin 310 so as to allow the first 306 and second 308 elongate members to fold into a V-shaped configuration. The pivot pin 310 may optionally be removed to further facilitate folding of the stroller.

The second and third embodiments of the stroller accessory bar of the present invention may include the hooks 18 and 20 of the first embodiment thereof. Indeed, the various features of any embodiment of the present invention may be included with any other embodiment thereof. For example, the folding second embodiment of the present invention may utilize the hook and loop attachment means 14 of the first embodiment rather than the snap attachments 112.

It is understood that the exemplary stroller accessory described herein and shown in the drawings represents only a presently preferred embodiment of the invention. Indeed, various modifications and additions may be made to such embodiment without departing from the spirit and scope of the invention. For example, various means for adjustably attaching the second hooks 20 and/or the drink holder 22 to the elongate support member 12 are contemplated. Also, various means for attaching the support member 12 to a stroller are likewise contemplated. Thus, these and other modifications and additions may be obvious to those skilled in the art may be implemented to adapt the present invention for use in a variety of different applications.

What is claimed is:

1. An accessory for holding a drink, said accessory comprising:
   (a) a drink holder comprising:
      (i) an annular support member;
      (ii) a plurality of fingers extending downwardly from said annular support member, said fingers configured to grip a drink disposed therebetween;
      (iii) said fingers being biased inwardly and movable outwardly such that various sizes of drinks are accommodated thereby;
   (b) a pivot mount formed to said drink holder for maintaining a drink held by said drink holder in a generally level orientation; and
   (c) means formed to said pivot mount for removably attaching said drink holder to a structural member.

2. The accessory as recited in claim 1 wherein said attachment means is configured for attachment to a stroller.

3. The accessory as recited in claim 1 wherein said fingers bend inwardly as they extend downwardly from said annular support member.

4. The accessory as recited in claim 1 wherein said fingers further comprise substantially horizontal support members configured such that the drink rests thereupon.

5. An accessory for holding a drink, said accessory comprising:
   (a) a drink holder;
   (b) a pivot mount formed to said drink holder for maintaining a drink held by said drink holder in a generally level orientation;
   (c) means formed to said pivot mount for removably attaching said drink holder to a structural member, said means comprising:
      (i) at least one resilient cushion;
      (ii) a corresponding number of straps; and
      (iii) wherein a portion of the structural member is capturable by each strap such that it abuts said cushion.

6. An accessory comprising:
   (a) an elongate support member comprising first and second elongate members configured to fold relative to one another to facilitate folding of a stroller;
   (b) attachment means for removably attaching said elongate support member to a structural member; and
   (c) at least one hook formed upon said elongate support member.

7. An accessory for holding a drink, said accessory comprising:
   (a) a drink holder;
   (b) a pivot mount formed to said drink holder for maintaining a drink held by said drink holder in a generally level orientation;
   (c) means formed to said pivot mount for removably attaching said drink holder to a structural member, said means comprising:
      (i) two resilient cushions;
      (ii) an elongate support member extending intermediate said support cushions; and
      (iii) a strap configured so as to hold each cushion in abutting contact with the structural member.

8. The accessory as recited in claim 7 wherein said elongate support member comprises first and second elongate members configured to fold relative to one another to facilitate folding of a stroller.

9. The accessory as recited in claim 7 wherein:
   (a) said pivot mount comprises first and second pivots diametrically positioned about said drink holder to facilitate pivoting of said drink holder about a first axis; and (b) further comprising a third pivot configured to facilitate pivoting of said drink holder about a second axis, the second axis being disposed approximately at a right angle to the first axis.

10. The accessory as recited in claim 9 wherein said third pivot comprises:

(a) a pivot post formed upon said drink holder;

(b) a non-locking slot formed to said attachment means for pivotally attaching said drink holder thereto by inserting said pivot post into said nonlocking slot; and (c) a locking slot formed to said attachment means for rigidly attaching said drink holder thereto by inserting said pivot post into said locking slot.

11. The accessory as recited in claim 10 wherein:

(a) said pivot post comprises a head having a flat portion formed thereon;

(b) said locking slot comprises a complimentary flat portion; and (c) wherein the abutment of the flat portion of the locking post with the flat portion of the locking slot prevents pivoting of the third pivot.

12. An accessory comprising:

(a) an elongate support member configured for attachment to a stroller;

(b) attachment means for removably attaching said elongate support member to the stroller, said attachment means comprising:
  (i) at least one resilient cushion;
  (ii) a corresponding number of straps;
  (iii) wherein a portion of the stroller is capturable by each strap such that it abuts said cushion; and (c) at least one hook formed upon said elongate support member.

13. The accessory as recited in claim 12 wherein said elongate support member is adjustable in length.

14. The accessory as recited in claim 12 wherein said at least one hook comprises a plurality of hooks, at least one of said plurality of hooks being slidably positionable along said support member.

15. An accessory comprising:

(a) first and second elongate members configured for attachment to a stroller and configured to fold relative to one another to facilitate folding of the stroller;

(b) attachment means for removably attaching said first and second elongate support member to the stroller; and (c) at least one hook formed upon at least one of said first and second elongate support member.

16. An accessory comprising:

(a) an elongate support member configured for attachment to a stroller;

(b) attachment means for removably attaching said elongate support member to the stroller;

(c) at least one hook formed upon said elongate support member; and (d) a drink holder attached to and slidably positionable along said support member.

17. An accessory comprising:

(a) an elongate support member;

(b) attachment means for removably attaching said elongate support member to a structural member;

(c) at least one hook formed upon said elongate support member; and (d) a drink holder attached to said support member, said drink holder comprising:
  (i) an annular support member;
  (ii) a plurality of fingers extending downwardly from said annular support member, said fingers configured to grip a drink disposed therebetween; and
  (iii) said fingers being biased inwardly and movable outwardly such that various sizes of drinks are accommodated thereby.

18. The accessory as recited in claim 17 wherein said fingers bend inwardly as they extend downwardly from said annular support member.

19. The accessory as recited in claim 17 wherein said fingers further comprise substantially horizontal support members configured such that the drink rests thereupon.

20. An accessory comprising:

(a) an elongate support member configured for attachment to a stroller;

(b) attachment means for removably attaching said elongate support member to the stroller;

(c) at least one hook formed upon said elongate support member; and (d) a drink holder attached to said support member, said drink holder comprising:
  (i) an annular support member;
  (ii) a plurality of fingers extending downwardly from said annular support member, said fingers configured to grip a drink disposed therebetween; and
  (iii) said fingers being biased inwardly and movable outwardly such that various sizes of drinks are accommodated thereby.

21. The accessory as recited in claim 20 wherein said fingers bend inwardly as they extend downwardly from said annular support member.

22. The accessory as recited in claim 20 wherein said fingers further comprise substantially horizontal support members configured such that the drink rests thereupon.

23. An accessory for holding a drink, said accessory comprising:

(a) a drink holder; and (b) a pivot mount formed to said drink holder for maintaining a drink held by said drink holder in a generally level orientation, said pivot mount comprising first and second pivots diametrically positioned about said drink holder to facilitate pivoting of said drink holder about a first axis and a third pivot configured to facilitate pivoting of said drink holder about a second axis, the second axis being disposed approximately at a right angle to the first axis, said third pivot comprising:
  (i) a pivot post formed upon said drink holder;
  (ii) a non-locking slot formed to said attachment means for pivotally attaching said drink holder thereto by inserting said pivot post into said non-locking slot; and
  (iii) a locking slot formed to said attachment means for rigidly attaching said drink holder thereto by inserting said pivot post into said locking slot.

24. The accessory as recited in claim 23 wherein:

(a) said pivot post comprises a head having a flat portion formed thereon;

(b) said locking slot comprises a complimentary flat portion; and (c) wherein the abutment of the flat portion of the locking post with the flat portion of the locking slot prevents pivoting of the third pivot.

25. An accessory comprising:
   (a) an elongate support member configured for attachment to a stroller;
   (b) attachment means for removably attaching said elongate support member to the stroller, said attachment means comprising generally semicircular strap attachments; and
   (c) at least one hook formed upon said elongate support member.

26. The accessory as recited claim 25 wherein said attachment means further comprise hook and loop straps for surrounding and grasping the stroller.

27. An accessory comprising:
   (a) an elongate support member configured for attachment to a stroller;
   (b) attachment means for removably attaching said elongate support member to the stroller;
   (c) at least one hook formed upon said elongate support member; and
   (d) a drink holder attached to said support member, said drink holder comprising a pivot mount for maintaining a drink held thereby in an upright position.

28. The accessory as recited in claim 27 wherein:
   (a) said pivot mount comprises first and second pivots diametrically positioned about said drink holder to facilitate pivoting of said drink holder about a first axis; and
   (b) further comprising a third pivot configured to facilitate pivoting of said drink holder about a second axis, the second axis being disposed approximately at a right angle to the first axis.

29. The accessory as recited in claim 28 wherein said third pivot comprises:
   (a) a pivot post formed upon said drink holder;
   (b) a non-locking slot formed to said attachment means for pivotally attaching said drink holder thereto by inserting said pivot post into said nonlocking slot; and
   (c) a locking slot formed to said attachment means for rigidly attaching said drink holder thereto by inserting said pivot post into said locking slot.

30. The accessory as recited in claim 29 wherein:
   (a) said pivot post comprises a head having a flat portion formed thereon;
   (b) said locking slot comprises a complimentary flat portion; and
   (c) wherein the abutment of the flat portion of the locking post with the flat portion of the locking slot prevents pivoting of the third pivot.

31. An accessory comprising:
   (a) an elongate support member, said support member being adjustable in length;
   (b) attachment means for removably attaching said support member to a structural member, said attachment means comprising:
      i) at least one resilient cushion;
      ii) a corresponding number of straps;
      iii) wherein the structural member is capturable by said strap such that it abuts said cushion;
   (c) a drink holder comprising:
      i) an annular support member;
      ii) a plurality of fingers extending downwardly from said annular support member, said fingers configured to grip a drink disposed therebetween;
      iii) said fingers being biased inwardly and movable outwardly such that various sizes of drinks are accommodated thereby; and
   (d) a plurality of hooks formed upon said support member, at least one of said hooks being slidably positionable along said support member.

32. An accessory comprising:
   (a) a foldable elongate support member;
   (b) attachment means for removably attaching said support member to a structural member, said attachment means comprising:
      i) at least one resilient cushion;
      ii) a corresponding number of straps;
      iii) wherein the structural member is capturable by said strap such that it abuts said cushion;
   (c) a drink holder comprising:
      i) an annular support member;
      ii) a plurality of fingers extending downwardly from said annular support member, said fingers configured to grip a drink disposed therebetween;
      iii) said fingers being biased inwardly and movable outwardly such that various sizes of drinks are accommodated thereby; and
   (d) a plurality of hooks formed upon said support member, at least one of said hooks being slidably positionable along said support member.

33. An accessory comprising:
   (a) an elongate support member;
   (b) attachment means for removably attaching said elongate support member to a structural member, said attachment means comprising:
      (i) at least one resilient cushion;
      (ii) a corresponding number of straps;
      (iii) wherein a portion of the structural member is capturable by each strap such that it abuts said cushion; and
   (c) at least one hook formed upon said elongate support member.

34. An accessory for holding a drink, said accessory comprising:
   (a) a drink holder, said drink holder comprising:
      (i) an annular support member;
      (ii) a plurality of fingers extending downwardly from said annular support member, said fingers configured to grip a drink disposed therebetween; and
      (iii) said fingers being biased inwardly and movable outwardly such that various sizes of drinks are accommodated thereby;
   (b) a pivot mount formed to said drink holder for maintaining a drink held by said drink holder in a generally level orientation; and
   (c) means formed to said pivot mount for removably attaching said drink holder to a structural member.

35. The accessory as recited in claim 34 wherein said fingers bend inwardly as they extend downwardly from said annular support member.

36. The accessory as recited in claim 34 wherein said fingers further comprise substantially horizontal support members configured such that the drink rests thereupon.

37. An accessory for holding a drink, said accessory comprising:
   (a) a drink holder; and
   (b) a pivot mount formed to said drink holder for maintaining a drink held by said drink holder in a generally level orientation; and (c) means formed to said pivot mount for removably attaching said drink holder to a structural member, said means comprising:
  (i) at least one resilient cushion;
  (ii) a corresponding number of straps; and
  (iii) wherein a portion of the structural member is capturable by each strap such that it abuts said cushion.

38. An accessory for holding a drink, said accessory comprising:
  (a) a drink holder; and
  (b) a pivot mount formed to said drink holder for maintaining a drink held by said drink holder in a generally level orientation; and
  (c) means formed to said pivot mount for removably attaching said drink holder to a structural member, said means comprising:
    (i) two resilient cushions;
    (ii) an elongate support member extending intermediate said support cushions; and
    (iii) a strap configured so as to hold each cushion in abutting contact with the structural member.

39. The accessory as recited in claim 38 wherein said elongate support member comprises first and second elongate members configured to fold relative to one another to facilitate folding of a stroller.

40. An accessory comprising:
  (a) an elongate support member;
  (b) attachment means for removably attaching said elongate support member to a structural member;
  (c) at least one hook formed upon said elongate support member; and
  (d) a drink holder attached to said support member, said drink holder comprising a pivot mount for maintaining a drink held thereby in an upright position.

41. The accessory as recited in claim 40 wherein:
  (a) said pivot mount comprises first and second pivots diametrically positioned about said drink holder to facilitate pivoting of said drink holder about a first axis; and
  (b) further comprising a third pivot configured to facilitate pivoting of said drink holder about a second axis, the second axis being disposed approximately at a right angle to the first axis.

42. The accessory as recited in claim 41 wherein said third pivot comprises:
  (a) a pivot post formed upon said drink holder;
  (b) a non-locking slot formed to said attachment means for pivotally attaching said drink holder thereto by inserting said pivot post into said non-locking slot; and
  (c) a locking slot formed to said attachment means for rigidly attaching said drink holder thereto by inserting said pivot post into said locking slot.

43. The accessory as recited in claim 42 wherein:
  (a) said pivot post comprises a head having a flat portion formed thereon;
  (b) said locking slot comprises a complimentary flat portion; and
  (c) wherein the abutment of the flat portion of the locking post with the flat portion of the locking slot prevents pivoting of the third pivot.

* * * * *